US006925994B2

(12) United States Patent
Michel

(10) Patent No.: US 6,925,994 B2
(45) Date of Patent: Aug. 9, 2005

(54) REGULATED ENGINE CRANKCASE GAS FILTER

(75) Inventor: Richard G. Michel, 913 Mack Crawford Rd., Chattahoochee, FL (US) 32324

(73) Assignee: Richard G. Michel, Chattahoochee, FL (US)

( * ) Notice: Subject to any disclaimer, the term of this patent is extended or adjusted under 35 U.S.C. 154(b) by 0 days.

(21) Appl. No.: 10/845,555

(22) Filed: May 14, 2004

(65) Prior Publication Data

US 2004/0244784 A1 Dec. 9, 2004

Related U.S. Application Data

(60) Provisional application No. 60/475,007, filed on Jun. 3, 2003.

(51) Int. Cl.[7] ............................................... F01M 13/04
(52) U.S. Cl. ...................................................... 123/573
(58) Field of Search ................................ 123/572–574, 123/41.86

(56) References Cited

U.S. PATENT DOCUMENTS

| | | |
|---|---|---|
| 3,257,995 A | 6/1966 | Schnabel |
| 3,259,247 A | 7/1966 | Tietz |
| 3,779,221 A | 12/1973 | Gartner |
| 3,877,451 A | 4/1975 | Lipscomb |
| 4,013,051 A | 3/1977 | Parcels |
| 4,089,309 A | 5/1978 | Bush |
| RE30,682 E | 7/1981 | Bush |
| 4,370,971 A | 2/1983 | Bush |
| 4,409,950 A | 10/1983 | Goldberg |
| 4,453,525 A | 6/1984 | DeBruler |
| 4,515,137 A | 5/1985 | Manolis |
| 4,528,969 A | 7/1985 | Senga |
| 5,586,996 A * | 12/1996 | Manookian, Jr. ............ 55/321 |
| 6,024,058 A | 2/2000 | Burnett |
| 6,058,917 A * | 5/2000 | Knowles ..................... 123/573 |
| 6,152,120 A * | 11/2000 | Julazadeh ................... 123/572 |
| 6,729,316 B1 * | 5/2004 | Knowles ..................... 123/572 |
| 2001/0022175 A1 | 9/2001 | Moren |
| 2002/0078936 A1 | 6/2002 | Shureb |
| 2002/0088212 A1 | 7/2002 | Ernst et al. |
| 2002/0100465 A1 | 8/2002 | Pietschner |
| 2002/0157999 A1 | 10/2002 | Baracchi et al. |

FOREIGN PATENT DOCUMENTS

DE            39 30 765 C1    2/1991

* cited by examiner

Primary Examiner—Marguerite McMahon

(57) ABSTRACT

The regulated engine crankcase gas filter is a cylindrical reactor vessel connected to a positive crankcase ventilation (PCV) valve tubing to eliminate formed particulates from the gaseous material by increasing the volume in an expansion chamber to increase gas expansion formed and filtering out the particulates by a stainless steel mesh filter. The cleaned gas flows into a vortex creating nozzle and atomizing chamber, then through a metering jet or a metering washer, so that a fine gas mist exits the filter to the engine intake air system. An access port is available to check and maintain the functional aspect of the filter. The check-ball plug or check plug containing the filter medium, i.e., the cotton, can be changed as needed. The check-ball plug provides a means for outside air to mix with the inside gas molecule on demand.

12 Claims, 5 Drawing Sheets

REGULATED ENGINE CRANKCASE GAS FILTER

CROSS-REFERENCE TO RELATED APPLICATION

This application claims the benefit of U.S. Provisional Patent Application Ser. No. 60/475,007, filed Jun. 3, 2003.

BACKGROUND OF THE INVENTION

1. Field of the Invention

The present invention relates generally to filters. More specifically, the invention is a filter unit that cleans and meters the gases flowing from the crankcase PCV valve to the intake of either a diesel or gas engine.

2. Description of the Related Art

The prior art of interest describes various gas filters, but none discloses the present invention. There is a need for an effective crankcase gas filter on an engine, gasoline or diesel, which will effectively clean the gas emitted. In addition, there is a need for a device that will decrease the filtering load of the catalytic converter in the exhaust pipe and provide for a cleaner combustion burn. The related art of interest will be discussed in the order of relevance to the present invention.

U.S. Pat. No. 4,089,309 issued on May 16, 1978, reissued as Re. 30,682 on Jul. 21, 1981, and U.S. Pat. No. 4,370,971 issued on Feb. 1, 1983, to Elmer W. Bush describe a crankcase emission separator of deleterious liquid and solid components and collector device comprising a crankcase emission separator and collector vessel equipped with filtration and a collector means for cleaning the air-fuel intake of an internal combustion engine. Atmospheric air is brought into collision with the emissions to enhance separation in a vessel containing fiberglass or glass beads. The cleaned gaseous fraction mixed with atmospheric air is then conducted from the vessel to a positive crankcase ventilation (PCV) valve interposed in a portion of the conduit leading from the separator-collector to the air-fuel intake side of the engine. The apparatus is distinguishable for requiring fiberglass or glass beads.

U.S. Pat. No. 4,013,051 issued on Mar. 22, 1977, to Ross M. Parcels describes an automotive crankcase emission control system comprising a spin-on type filter included in a conventional emission control system to recycle the filtered fumes into the fuel intake manifold. The system is distinguishable for requiring a spin-on type filter.

U.S. Pat. No. 3,877,451 issued on Apr. 15, 1975, to Virgil J. Lipscomb describes a PCV valve filter device comprising a means for mounting a replaceable filter in a housing and cover between an engine crankcase and a PCV valve. The device is distinguishable for requiring only a replaceable filter located in the housing and cover.

U.S. Patent Publication No. 2001/0022175, published on Sep. 20, 2001, describes a combined crankcase and canister ventilation system for a supercharged combustion engine comprising a device to separate oil from evacuated blow-by gas, a separate oil collection chamber, and various conduits including one from the air filter.

U.S. Patent Publication No. 2002/0078936, published on Jun. 27, 2002, describes a separator and oil trap above the engine for closed crankcase ventilator and supercharged systems comprising an air-oil separator container having alternating flat plate baffles receiving exhaust from the rocker arm cover, passing the cleaned air to a crankcase depression regulator device to a turbocharger, and exiting through the exhaust line.

U.S. Patent Publication No. 2002/0088212, published on Jul. 11, 2002, describes two embodiments for separating oil from crankcase gases. A first embodiment includes a separating cartridge having two-component end disks in a separate housing for separating oil from crankcase gases and comprising a suction relief valve in a nipple on a cylindrical housing containing a cylindrical separating cartridge composed of a non-woven separating cloth wound around a support body having end plates of a two-component synthetic resin material. The oil collects in the cartridge and drips through a return flow valve at the bottom to the crankcase, whereas the incoming gas enters the housing from a separate aperture at the bottom of the main housing to flow upward to the separating cartridge. The second embodiment locates the housing directly on the crankcase housing. The devices are distinguishable for requiring specific filter compositions, a suction relief valve, and a return flow valve.

U.S. Patent Publication No. 2002/0100465, published on Aug. 1, 2002, describes a device to deoil the crankcase ventilation gases of an internal combustion engine comprising at least one oil mist separator device provided which has a gas inlet connected to a first pressure area and is connected to the crankcase. The separator has a gas outlet connected to a second pressure area, and is connected to the air intake section of the engine. The separator has a bypass channel that has a gas inlet connected to the first pressure area, and a gas outlet connected to the second pressure area. A control valve opens or closes the bypass channel depending on the pressure difference between the two pressure areas. An oil-mist separator cyclone and the control valve in the bypass channel closing to create flow diversion or impact separation in the bypass channel accomplish deoiling. The deoiling device is distinguishable for its requirement for a bypass valve and a cyclone oil-mist separator.

U.S. Patent Publication No. 2002/0157999, published on Oct. 31, 2002, describes numerous filter devices for a diesel fuel engine comprising an upright cylindrical container receiving the water-containing fuel on top and passing the fuel through a vertical filter mass, and first and second parallel micromesh screens which collect the water to drain into a collection chamber which is periodically drained by disconnecting the filter device. The diesel fuel filter is distinguishable for dewatering a different fuel in the liquid state.

U.S. Pat. No. 3,257,995 issued on Jun. 28, 1966, to William H. Schnabel describes a crankcase ventilator device for removing solid particles, such as sludge and other foreign matter, comprising a water containing glass jar in the engine compartment receiving crankcase vapors. The device has a cylindrical sleeve with its lower half perforated and the bottom closed. The sleeve contains a cylindrical screen containing a horizontal fire screen separating an upper limited volume of Fiberglas from the lower volume of Fiberglas. The crankcase vapor enters a vertical inlet pipe in the device and travels upward to be cleaned and recycled to the exhaust manifold. The device is distinguishable for requiring a single pass through a Fiberglas filter.

U.S. Pat. No. 3,779,221 issued on Dec. 18, 1973, to Joseph J. Gartner describes a pollution control device for an internal combustion engine comprising, in a main embodiment, a cylindrical housing accepting blow-by gas from the crankcase into its side to traverse multiple filter plates in an upper region and out to a PCV valve to an intake manifold. Another inner chamber inside the cylindrical housing below the filter plates in a centered cylindrical housing receives hot gas from the engine exhaust manifold.

Air is added into the housing from a side nipple. A centered shaft removable from the top of the housing is centered and passes through the filter plates to the inner chamber. The device is distinguishable for utilizing stack filter plates and end plates.

U.S. Pat. No. 4,409,950 issued on Oct. 18, 1983, to Nathan Goldberg describes a fuel saving and pollution control device comprising a cylindrical canister containing a perforated vertical tube accepting emission gas from the PCV valve, an annular filter unit made of either plastic or clay treated oil and gasoline resistant paper or metal, and an inner metal perforated tube which passes the effluent gas out through the top into the outlet tube and the intake manifold of the engine. The oil in the canister settles in the bottom at the circular condensing screen. The device is distinguishable for requiring an annular filter insert, a perforated metal inner tube, and a condensing oil screen.

U.S. Pat. No. 4,453,525 issued on Jun. 12, 1984, to Gregory DeBruler describes a device for treating crankcase vapor emissions of automotive engines interposed between the engine crankcase, ventilation port and the air-fuel intake manifold comprising a transparent upright glass or plastic vessel covered by a domed cover receiving crankcase emissions in a right-angled tube which continues down through a circular filter made of either steel mesh containing cotton fiber or a reusable three- or four-layered steel mesh. A shorter right-angled outlet tube returns the cleaned gases to the intake manifold of the engine. The device is mounted on the firewall. The device is distinguishable for requiring a laminated mesh filter and for being mounted on the firewall.

U.S. Pat. No. 4,515,137 issued on May 7, 1985, to John Manolis describes at least five embodiments of a crankcase emissions device separating liquid from gases comprising a metal cylinder connected to the PVC hose providing a restricting effect of the flow path in the crankcase gases and vapors. The metal cylinder can have a deflecting flange or ledge in the outlet tube or midway in the cylinder in the form of various baffles. As the vapors enter the cylinder, they expand and condense along the wall as they flow upwardly to produce an oil film that will return to the crankcase. The device is distinguishable for requiring only upward vertical movement of the gases in the device.

U.S. Pat. No. 4,528,969 issued on Jul. 16, 1985, to Akihisa Senga describes a blow-by gas passage system for a V-type internal combustion engine comprising longitudinally spaced passages formed on each side and parallel to the cylinders in each cylinder bank. Corresponding passages formed in each cylinder head allow for communication between the crankcase and a cavity formed in the space between the two banks of cylinders. An oil separator with a plurality of baffles arranged in a labyrinth-type arrangement is mounted on top of the cylinder block over the collection cavity. An intake manifold is mounted on top of the oil separator, and has an internal passage formed corresponding to the exit port of the oil separator. The other end of the intake manifold is fitted with a PCV valve that is attached to a pipe leading to the engine air inlet passages of the intake manifold. The device is distinguishable for being limited to and integral with a V-type internal combustion engine.

U.S. Pat. No. 6,024,058 issued on Feb. 15, 2000, to Darren W. Burnett describes a blow-by oil separator and reservoir device in a retrofitting kit for adding to an internal combustion diesel engine comprising a bowl-shaped reservoir oriented vertically and having a lid with a tee connection. A conventional blow-by oil hose is attached to the vertical portion of the tee connection to feed gaseous influent while the elbow conduit funnels the gaseous effluent to the ambient atmosphere or recycles to the diesel engine. A valve in the bottom outlet port of the reservoir empties the oil fraction in the reservoir. The device is distinguishable for being limited to processing diesel emissions and requiring a bowl-shaped reservoir.

German Patent No. 3,930,765, published on Feb. 28, 1991, describes a tubular gas filter containing several chambers for cleaning dust from the gas under each chamber comprising a dust collection bunker under each chamber and a clean gas duct above each chamber. At the side of the chambers, ducts for distribution of unfiltered gas and for the collection of clean gas are provided. Below these ducts are a conical unfiltered gas inlet and a gas guide arrangement for each chamber with an upper wall section to form a partial gas stream flowing transverse to the chamber, and a lower wall section forming a longitudinal gas stream. The wall sections can swivel on a common horizontal shaft. An advantage of this apparatus is uniform dust precipitation over the whole filter surface of a chamber. The apparatus is distinguishable for requiring structural features not seen in the present invention.

None of the above inventions and patents, taken either singly or in combination, is seen to describe the instant invention as claimed. Thus, a regulated engine crankcase gas filter solving the aforementioned problems is desired.

SUMMARY OF THE INVENTION

The present invention is directed to a regulated crankcase gas filter essentially made of polyvinyl chloride that cleans the crankcase gases flowing from the crankcase and the positive crankcase ventilation (PCV) valve of a diesel or gas engine. The plastic unit is cylindrical with an inlet port and an outlet port that mates with the hose used to connect the engine crankcase's PCV valve to the engine intake/air stream. Once the filter device is installed, the cylindrically shaped filter housing provides initially a larger volume for gas flow that reduces the high flow rate of vapor and particulate matter effluent from the crankcase. The reduction of volume flow allows particulates to precipitate from the vapor state. A stainless steel mesh contained inside the filter housing further reduces the particulate composition of the engine crankcase gas flow. A fine vortex metered gaseous mist is then created and fed to the intake air stream of the engine. A threaded port in a side portion of the filter housing retains a cotton fiber mass, a threaded check plug or a threaded check-ball plug, for routinely viewing and cleaning out the particulate build-up in the filter and the engine. The check-ball plug allows outside air to mix with the inside gas molecules. The processed gas is recycled into the engine intake/air stream. The gas filter device is distinguishable for metering crankcase gas flow into the air intake portion of an internal combustion engine for a more complete combustion burn.

Accordingly, it is a principal object of the invention to provide a plastic filter unit for cleaning the gaseous effluent containing particulate matter from an engine crankcase.

It is another object of the invention to provide a cylindrical filter unit connecting the crankcase effluent after the PCV valve to the engine's air/fuel intake.

It is a further object of the invention to provide an initial decrease in gas volume flow in the filter unit for precipitation of particulate matter.

Still another object of the invention to provide a stainless steel mesh in the filter unit that further reduces the particulate composition of the gas flow.

It is yet another object of the invention to provide after the mesh filter, a fine vortex metered gaseous mist to the intake air stream of an engine to increase complete combustion, and thereby gas mileage.

Yet another object of the invention is to provide a filter unit with minimal moving internal parts, and is not affected by corrosive vapors or elements and temperature variations.

Still another object of the invention is to provide a cleanout check port in the filter unit for inspecting the condition of the cotton, and to provide for outside air to mix with inside gas molecules on demand.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is directed to a regulated engine crankcase gas filter device attached upstream or downstream to the positive crankcase ventilation (PCV) valve via a tube on either gasoline or diesel engines to separate particulate matter, which is caused to precipitate when traversing the device, and providing a vortex metered gas mist to enter the engine at its air-fuel intake manifold. The device further enables the periodic removal of precipitate from the device.

Figure 1:
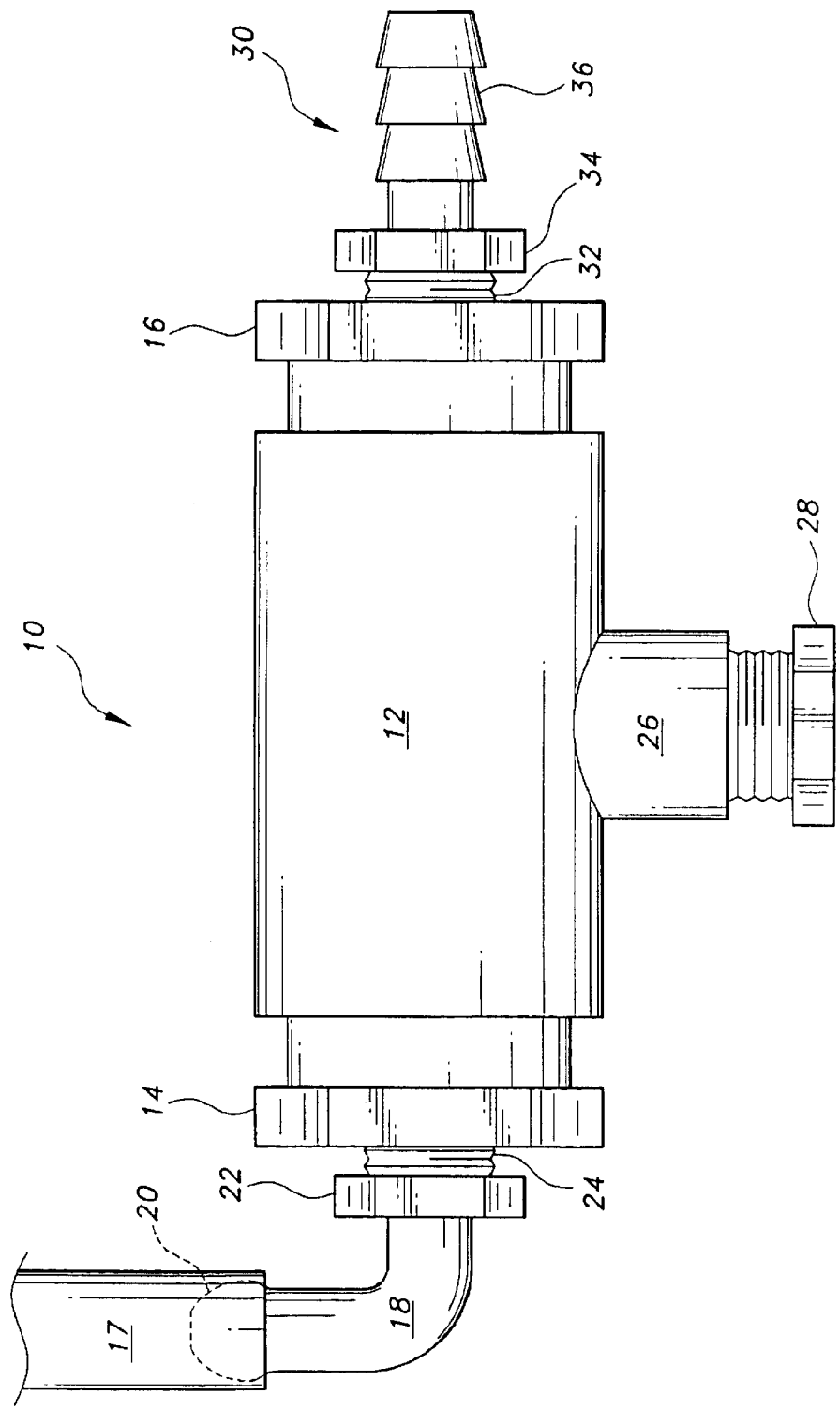
FIG. 1 is an elevational side view of a regulated engine crankcase gas filter device according to the present invention.

FIG. 1 illustrates the external configuration of the regulated engine crankcase gas filter device 10 having specific parts and function which will be fully explained in FIGS. 2–5. The reactor vessel main body 12 is substantially cylindrical and is partially closed at its ends by an intake collar 14 and an outlet collar 16 which are cemented into opposing ends of the cylindrical main body 12. The influent crankcase gases enter from the PCV tube 17 to a nylon inlet nipple 18 that comprises an elbow nozzle having a frontal lip portion 20, a distal ridged portion 22 and an externally threaded end portion 24. An internally threaded cylindrical cleanout access port 26 is provided at a midpoint of the reactor vessel 12, and closed with an externally threaded check plug 28 or check-ball plug 70, the latter being shown and described with reference to FIG. 4, below.

A nylon outlet nipple 30 has an externally threaded portion 32 for connection to the reactor vessel 12, a hexagonal head portion 34, and a grooved connecting portion 36 for connection to an outlet hose (not shown).

Figure 2:
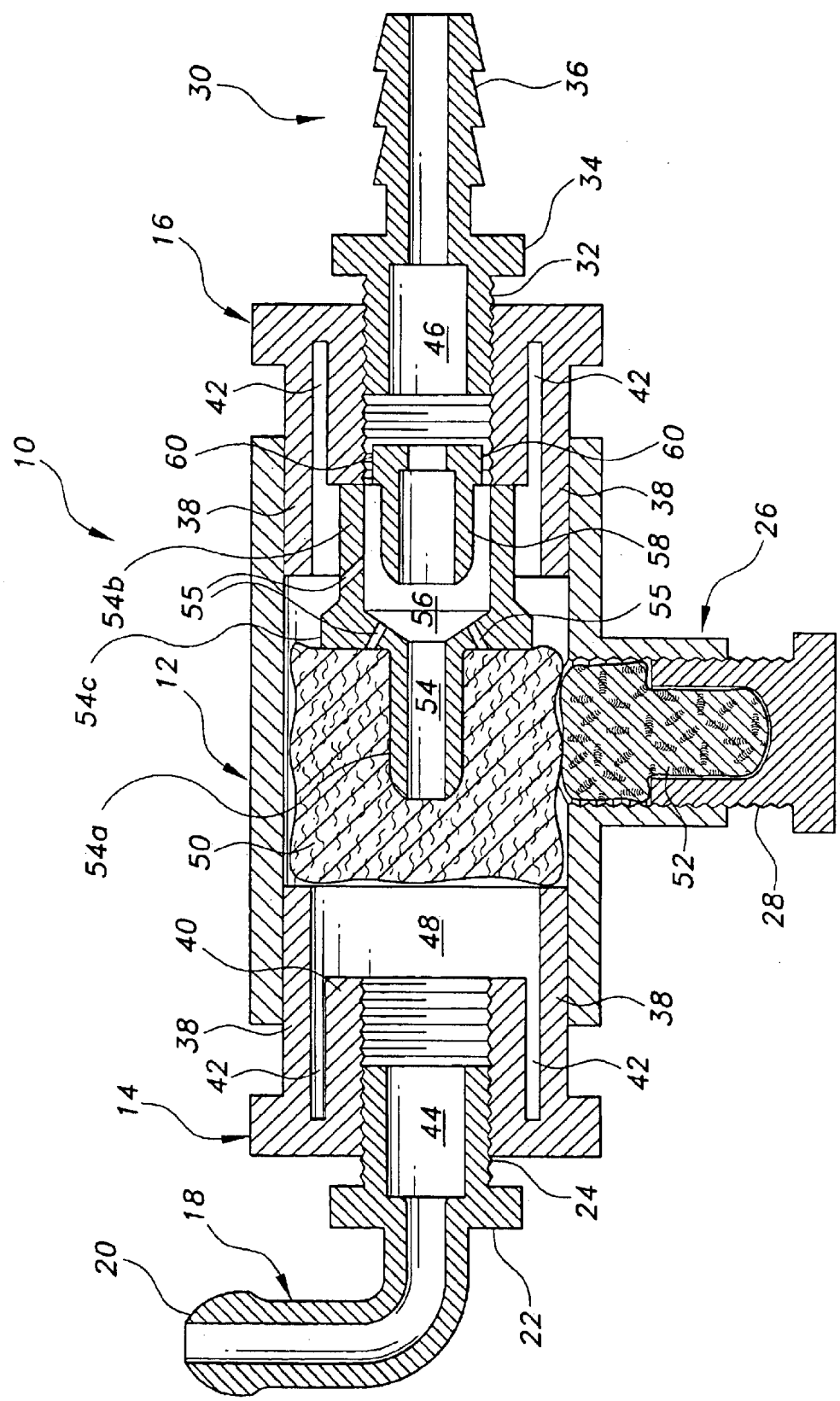
FIG. 2 is a cross-sectional side view of the device with the check plug and metering jet.
Figure 3:
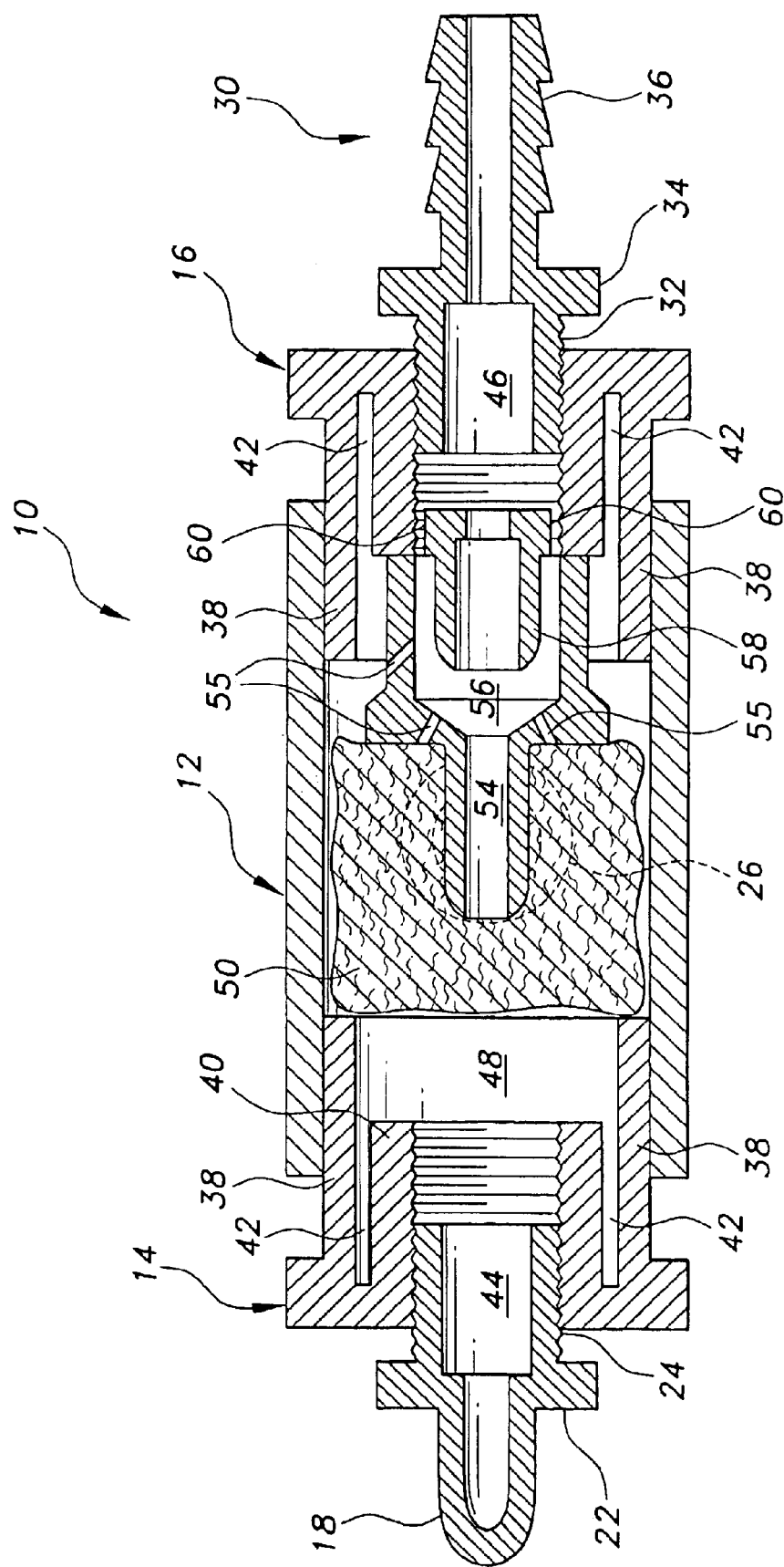
FIG. 3 is cross-sectional top plan view of the device with the metering jet.

Referring to FIGS. 2 and 3, the intake collar 14 and outlet collar 16, respectively, have a cylindrical configuration with an outer wall 38 and a shorter, concentric, internally threaded inner wall 40 that is separated from outer wall 38 by an annular space 42. An intake plenum 44 and an outlet plenum 46 are defined by inlet nipple 18 and outlet nipple 30, respectively, the nipples 18 and 30 being threaded into intake collar 14 and outlet collar 16, respectively. Located between the plenums 44 and 46 is a separator-expansion chamber 48. A stainless steel mesh 50 is contained in the separator-expansion chamber 48. A cotton fiber ball 52 is contained in the internal volume of the access port 26, and is used as a visual aid to determine the degree of filtering capacity.

A nylon vortex nozzle 54 extends from the inner wall 40 of outlet collar 16 into the separator-expansion chamber 48. Nozzle 54 has a narrow diameter inlet. 54a extending into separation-expansion chamber 48, a wide diameter outlet or base portion 54b abutting the inner wall 40 of outlet collar 16, and a face portion 54c disposed between the narrow inlet and wide base portion. The face portion and the base portion define an atomization chamber 56. Nozzle 54 has a plurality of holes 55 defined therein, i.e., one main axial bore extending through the center of the nozzle 54, three spaced atomization channels (only two shown in FIG. 2) extending obliquely in the face portion at an angle of about 27° relative to the axis of the nozzle 54, and three atomization channels (only one shown in FIG. 2) extending obliquely in the base portion at an angle of about 45° relative to the axis of the nozzle 54, that pass the cleaned gas from separator-expansion chamber 48 into the atomizer chamber 56. A narrowed diameter metering jet 58, made of nylon, extends into atomization chamber 56 and discharges into outlet plenum 46. The number of holes 55 in nozzle 54 can be varied.

The 27-degree inclination angle in the face portion 54c and the 45-degree inclination angle in the base portion 54b of the vortex nozzle 54 can be altered to accommodate either the placement of the metering jet portion 58 or the metering washer 64 (shown in FIGS. 4 and 5) located approximately inside the outlet plenum 46.

The metering jet 58 may have six metering jet slots 60 which permit gas to flow out with a secondary atomization quality into the outlet plenum 46. The cleaned gas effluent leaves the outlet nipple 30 and is recycled to the engine intake or air/gas manifold.

In operation, the flow of gases from the crankcase undergoes a decrease in velocity and increase in pressure in transitioning from inlet nipple 18 to inlet plenum 44 and separation/extraction chamber 48, and are filtered by stainless steel mesh 50 to remove oil and particulate matter. The cleansed gases are undergo acceleration and atomization entering vortex nipple 54, a decrease in velocity in base portion 54b, then acceleration and secondary atomization through metering jet 58 and slots 60, being discharged through outlet plenum 46 and outlet nipple 30, where the metered, cleansed, atomized gas is drawn to the intake manifold by engine vacuum. The condition of the filter media can be periodically checked by removing check plug 28.

Inlet nipple 18, outlet nipple 30, vortex nozzle 54, and metering jet 58 are preferably made from nylon. Inlet collar 14, outlet collar 16, main body 12, and check plug 28 are preferably made from polyvinyl chloride.

In a recent long distance trip the vehicle with this filter averaged 39 miles per gallon gasoline traveling at highway speeds from 23 miles per gallon without the device.

Thus, an effective filter for crankcase vapors has been shown which is reusable and refillable with new cotton indicator material.

Figure 4:
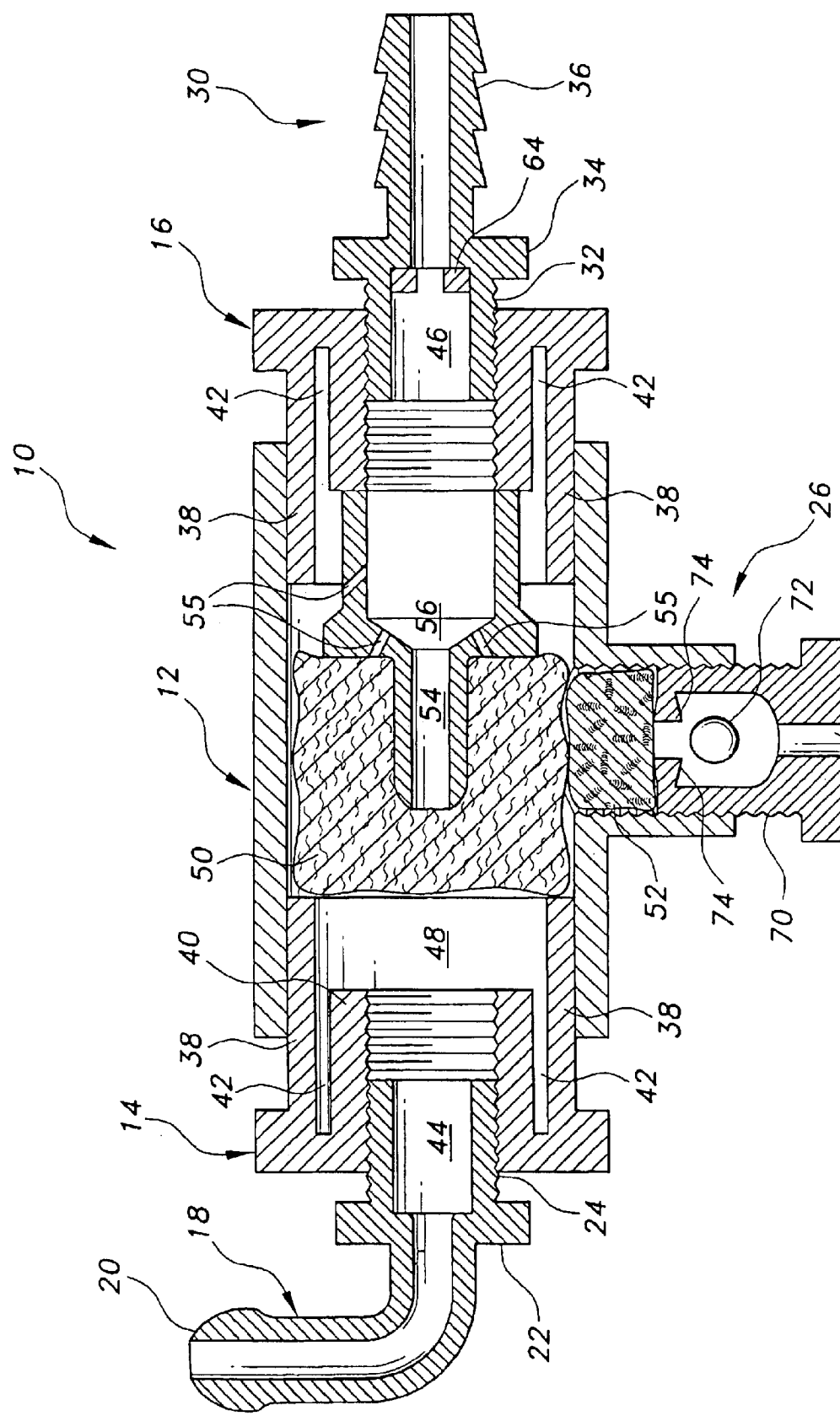
FIG. 4 is a cross-sectional side view of the device with the check-ball plug and metering washer.

Referring to FIG. 4, the check-ball plug 70 comprises a center bore 76 positioned at the bottom of the check-ball plug 70 for air intake, a check ball 72 positioned within the cavity of the check-ball plug 70, a restrictor washer 74 contained approximately above the check-ball plug 70, and a cotton fiber mass 52 contained in an interior region of the access port 26 approximately above the restrictor washer 74. In operation, the check ball floats, blocking the center bore 76 to prevent the ingress of air at rest, rising against restrictor washer 74 at full throttle, and floating between rest and full throttle to allow air to mix with the cleansed gas.

Figure 5:
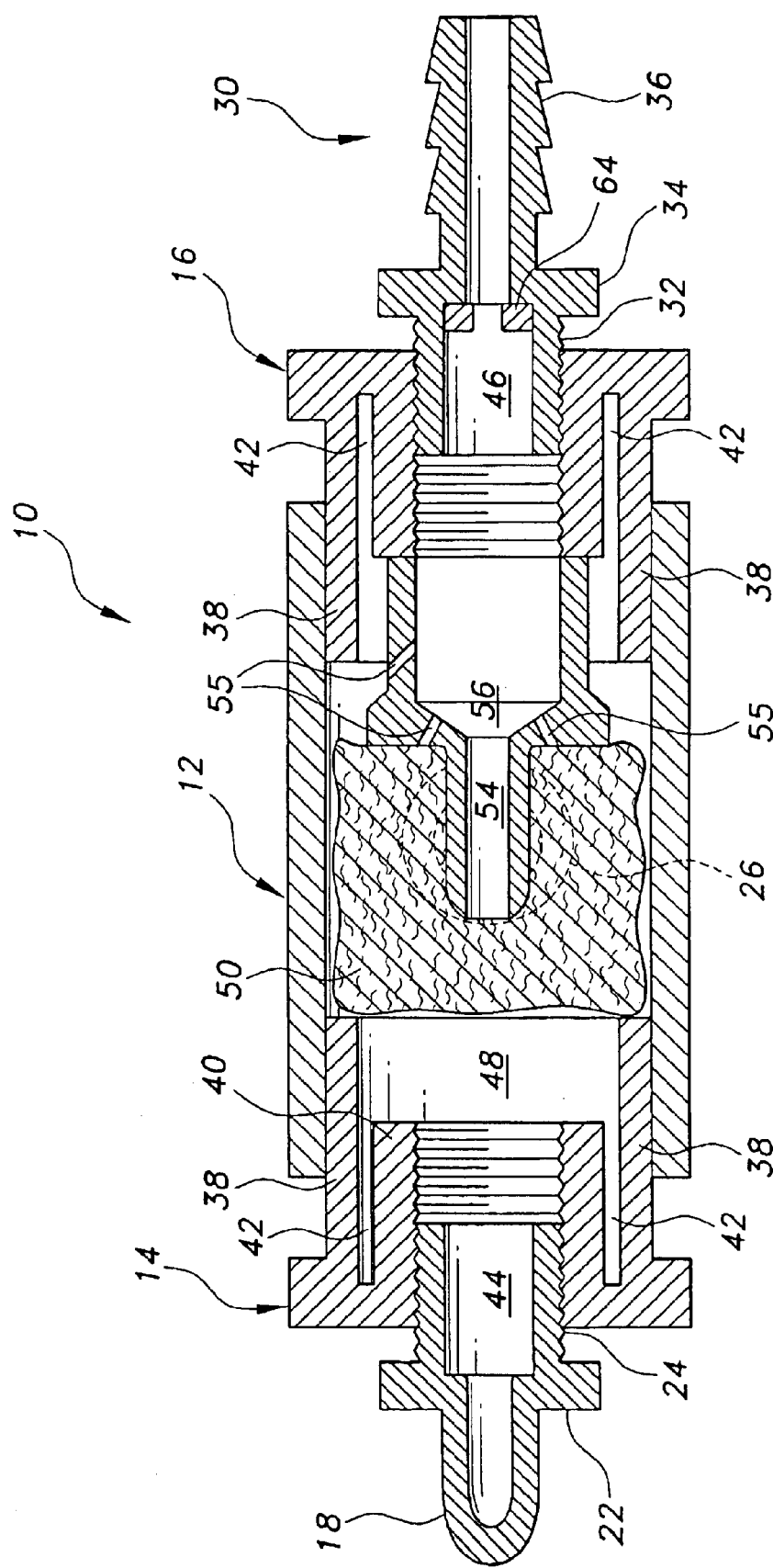
FIG. 5 is cross-sectional top plan view of the device with the metering washer.

Referring to FIGS. 4 and 5, metering jet 58 has been removed from atomizer chamber 56 and replaced by metering washer 64 in outlet plenum 46. This optional configuration eliminates the need for the six metering jet slots 60 and secondary atomization.

It is to be understood that the present invention is not limited to the embodiment described above, but encompasses any and all embodiments within the scope of the following claims.

I claim:

1. A regulated engine crankcase gas filter device, comprising:

a reactor vessel, the reactor vessel being an elongated body having a first end and a second end, the elongated body defining a separator-expansion chamber having a diameter;

an inlet port disposed at the first end of the elongated body, the inlet port being adapted for attachment to a crankcase PCV hose;

an outlet port disposed at the second end of the elongated body, the outlet port being adapted for attachment to a hose to an intake manifold, the inlet and outlet ports each defining an inside diameter smaller than the diameter of the separator-expansion chamber;

a mesh contained in the separator-expansion chamber;

a vortex nozzle disposed between the separation-expansion chamber and the outlet port, the vortex nozzle defining an atomization chamber; and metering means disposed between the vortex nozzle and the outlet port for metering cleansed crankcase gas through the outlet port;

whereby gases from the crankcase expand and are filtered in the separator-expansion chamber, atomized, and metered to the intake manifold.

2. The filter according to claim 1, wherein the reactor vessel is substantially cylindrical.

3. The filter according to claim 1, wherein the mesh is stainless steel.

4. The filter according to claim 1, wherein the elongated body further comprises an access port opening into the separator-expansion chamber, the filter further comprising:

a check plug removably disposed in the access port; and a cotton fiber ball disposed in the access port between the check plug and the separator-expansion chamber.

5. The filter according to claim 1, wherein the elongated body further comprises an access port opening into the separator-expansion chamber, the filter further comprising:

a check-ball plug removably disposed in the access port, the check-ball plug defining an inlet bore, a cavity, and an outlet bore communicating with the separator-expansion chamber and having a check ball positioned within the cavity and a restrictor washer at the outlet bore; and a cotton fiber ball disposed in the access port above the restrictor washer.

6. The filter according to claim 1, wherein the inlet port comprises:

an intake collar having an outer wall attached to the elongated body and an inner wall separated from the outer wall by an annular space, the inner wall being internally threaded; and an elbow-shaped inlet nipple having an externally threaded first end engaging the inner wall of the inlet collar and a second end having a lip for receiving the crankcase PCV hose, the first end defining an inlet plenum.

7. The filter according to claim 1, wherein the outlet port comprises:

an outlet collar having an outer wall attached to the elongated body and an inner wall separated from the outer wall by an annular space, the inner wall being internally threaded; and a straight outlet nipple having an externally threaded first end engaging the inner wall of the outlet collar and a second end having adapted for receiving the hose to the intake manifold, the first end defining an outlet plenum.

8. The filter according to claim 1, wherein the vortex nozzle is made from nylon.

9. The filter according to claim 1, wherein the metering means comprises a metering jet made from nylon.

10. The filter according to claim 1, wherein the vortex nozzle has an elongated inlet extending into the separator-expansion chamber, a base portion defining the atomization chamber and abutting the outlet port, and a face portion disposed between the inlet and the base portion, the nozzle defining a main bore extending axially therethrough, the base portion having a wide diameter and the outlet a narrow diameter, the face portion having a plurality of face atomization channels extending obliquely between the separator-expansion chamber and the atomization channel at an inclination of approximately 27° degrees relative to the main axial bore, the base portion having a plurality of base atomization channels extending obliquely between the separator-expansion chamber and the atomization chamber at an inclination of approximately 45° relative to the main axial bore.

11. The filter according to claim 1, wherein said metering means comprises a metering jet having a central axial bore and a plurality of peripheral metering jet slots defined therein for ejecting the gas to the outlet port.

12. The filter according to claim 1, wherein said metering means comprises a metering washer disposed between the atomization chamber and said outlet port.

* * * * *